US008948714B2

(12) United States Patent
Motoyama

(10) Patent No.: US 8,948,714 B2
(45) Date of Patent: Feb. 3, 2015

(54) LOW NOISE CONVERTER OF SATELLITE BROADCASTING RECEIVER

(75) Inventor: Kohji Motoyama, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 108 days.

(21) Appl. No.: 13/567,224

(22) Filed: Aug. 6, 2012

(65) Prior Publication Data

US 2013/0078938 A1 Mar. 28, 2013

(30) Foreign Application Priority Data

Sep. 26, 2011 (JP) ................................ 2011-209041

(51) Int. Cl.
*H04B 1/04* (2006.01)
*H04H 40/90* (2008.01)

(52) U.S. Cl.
CPC .................................... *H04H 40/90* (2013.01)
USPC ........................... 455/118; 455/131; 455/313

(58) Field of Classification Search
CPC .......... H04B 1/30; H04B 1/18; H04B 1/3211
USPC ................................................ 455/118, 131
See application file for complete search history.

(56) References Cited

U.S. PATENT DOCUMENTS

| | | | |
|---|---|---|---|
| 5,649,311 A | 7/1997 | Somei | |
| 6,009,304 A | 12/1999 | Kato | |
| 6,252,551 B1 | 6/2001 | Noro et al. | |
| 6,832,071 B1 | 12/2004 | Nakamura et al. | |
| 2004/0209584 A1* | 10/2004 | Bargroff et al. | 455/180.1 |
| 2004/0209588 A1 | 10/2004 | Bargroff | |
| 2004/0214537 A1 | 10/2004 | Bargroff et al. | |
| 2005/0005296 A1 | 1/2005 | Bargroff et al. | |
| 2005/0282510 A1* | 12/2005 | Bang et al. | 455/190.1 |

(Continued)

FOREIGN PATENT DOCUMENTS

| | | |
|---|---|---|
| EP | 1 096 667 A1 | 5/2001 |
| JP | 8-293812 A | 11/1996 |
| JP | 2001-168751 A | 6/2001 |
| JP | 2002-171450 A | 6/2002 |
| JP | 2005-303962 A | 10/2005 |
| JP | 2006-510247 A | 3/2006 |

OTHER PUBLICATIONS

European Search Report for corresponding EP Application No. 12006211.2, dated Jan. 21, 2013.

(Continued)

*Primary Examiner* — Temesgh Ghebretinsae
*Assistant Examiner* — Richard Chan
(74) *Attorney, Agent, or Firm* — Birch, Stewart, Kolasch & Birch, LLP

(57) ABSTRACT

A low noise converter includes a plurality of amplification circuits receiving a plurality of polarized wave signals transmitted from a satellite for amplifying the plurality of polarized wave signals, respectively, a plurality of switch circuits, each selecting one of outputs from the plurality of amplification circuits, a plurality of filter circuits provided corresponding to the plurality of switch circuits, respectively, for removing an image signal, a plurality of signal mixer-amplifiers provided corresponding to the plurality of filter circuits, respectively, to frequency-convert each output from the plurality of filter circuits by mixing with a local oscillation signal and to amplify the frequency-converted signal, and a plurality of output ports provided corresponding to the plurality of signal mixer-amplifiers, respectively, to receive an output from the plurality of signal mixer-amplifiers.

4 Claims, 9 Drawing Sheets

(56) References Cited

U.S. PATENT DOCUMENTS

| | | | | |
|---|---|---|---|---|
| 2007/0001754 | A1 * | 1/2007 | Lakdawala et al. | 327/552 |
| 2007/0111661 | A1 * | 5/2007 | Bargroff et al. | 455/13.3 |
| 2008/0295137 | A1 | 11/2008 | Chen | |
| 2011/0189970 | A1 * | 8/2011 | Ohshiro | 455/302 |

OTHER PUBLICATIONS

T. Copani, et al., "A 12-GHz Silicon Bipolar Dual-Conversion Receiver for Digital Satellite Applications" IEEE Journal of Solid-State Circuits, IEEE Service Center, vol. 40, No. 6, Jun. 1, 2005.

* cited by examiner

LOW NOISE CONVERTER OF SATELLITE BROADCASTING RECEIVER

This nonprovisional application is based on Japanese Patent Application No. 2011-209041 filed on Sep. 26, 2011 with the Japan Patent Office, the entire contents of which are hereby incorporated by reference.

BACKGROUND OF THE INVENTION

1. Field of the Invention

The present invention relates to low noise converters, particularly a low noise converter of a satellite broadcasting receiver.

2. Description of the Background Art

FIG. 8 represents a typical satellite broadcasting reception system.

Referring to FIG. 8, a low noise converter (LNB: Low Noise Block Down Converter) 102 is attached to an antenna 101. Antenna 101 receives incoming signals having a frequency in the 12 GHz band (11.71 GHz-12.01 GHz) from a broadcasting satellite 110.

Low noise converter 102 frequency-converts an incoming weak radio wave from broadcasting satellite 110 into an IF signal of the 1 GHz band and applies low-noise amplification for supply to the so-called STB (Set Top Box: tuner) 104 that is connected. A signal of low noise and sufficient level by virtue of low noise converter 102 is supplied to STB 104. STB 104 has the IF signal supplied from a coaxial cable 103 processed by the internal circuit for supply to a television 105.

FIG. 9 is a block diagram representing an example of the circuit of a general low noise converter.

Referring to FIG. 9, an incoming signal of the 12 GHz band is received at an antenna probe 213 in a feed horn (waveguide), subjected to low-noise amplification at a low noise amplifier 204 (LNA), and then passed through a band pass filter (BPF) 206 that serves to pass through a signal of the desired frequency band and remove any signal of the image frequency band. The signal passed through band pass filter 206 is mixed by a mixer 208 with a local oscillation signal of 10.678 GHz from a local oscillator 218 to be converted into an intermediate frequency signal of the 1 GHz band, i.e. frequency-converted into an intermediate frequency (IF) signal.

The output from mixer 208 is amplified at an intermediate frequency amplifier 210 to have an appropriate noise property and gain property for transmission to a terminal P1 via a capacitor 212. The low noise converter has a power supply circuit 220 provided for receiving DC voltage via an inductor 214 to supply the required power supply current or bias voltage to LNA 204, local oscillator 218 and intermediate frequency amplifier 210. For the purpose of preventing the IF signal from entering the power supply system, inductor 214 and capacitor 216 are connected at a connection node of terminal P1 and power supply circuit 220.

One known type of a low noise converter is a universal LNB having incoming signals of two bands differing in frequency from a broadcasting satellite, frequency-converted at local oscillators corresponding to two different types of frequencies for using a switched one, and receiving two types of polarized waves (horizontal polarized wave (H polarized wave), vertical polarized wave (V polarized wave)) of incoming signals by switching an LNA first-stage element.

FIG. 10 is a block diagram representing an example of a circuit of a universal low noise converter.

Referring to FIG. 10, a universal low noise converter includes a feed horn 202#, an LNA 204# selectively amplifying a V polarized wave signal and H polarized wave signal applied from feed horn 202#, a band pass filter 206 limiting the band of the output from LNA 204#, local oscillators 218A and 218B, a mixer 208 mixing a local oscillation signal from local oscillators 218A and 218B with the output from band pass filter 206 for conversion into an intermediate frequency, an intermediate frequency amplifier 210 amplifying the output of mixer 208, and a capacitor 212 coupled between the output of intermediate frequency amplifier 210 and terminal P1.

The universal low noise converter further includes an inductor 214 for transmitting DC voltage, and a power supply circuit 220# receiving DC voltage via inductor 214 to supply power to LNA 204#, local oscillators 218A and 218B, and intermediate frequency amplifier 210. For the purpose of preventing the IF signal from entering the power supply system, inductor 214 and capacitor 216 are connected at the connection node of terminal P1 and power supply circuit 220#.

LNA 204# includes an amplification circuit 205A amplifying a V polarized wave signal, an amplification circuit 205B amplifying an H polarized wave signal, and an amplification circuit 205C having its input coupled to the outputs of amplification circuits 205A and 205B.

Local oscillator 218A outputs a first local oscillation signal (9.75 GHz). Local oscillator 218B outputs a second local oscillation signal (10.6 GHz) having a frequency higher than that of local oscillator 218A.

Power supply circuit 220# selectively supplies voltage to amplification circuit 205A or 205B depending upon whether an in-door tuner receives a V polarized wave signal or an H polarized wave signal. The switching of high/low frequency of the local oscillator is allowed by selectively supplying voltage to local oscillator 218A or 218B.

There is also a low noise converter having two or more output terminals, and a circuit that can output an arbitrary or fixed signal from each of the output terminals.

FIG. 11 is a block diagram representing an example of a universal twin low noise converter.

Referring to FIG. 11, a universal twin low noise converter includes a feed horn 203, a frequency conversion unit applying frequency conversion to an H polarized wave signal received by feed horn 203 to output two IF signals, and a frequency conversion unit to apply frequency conversion to a V polarized wave signal received by feed horn 203 to output two IF signals.

Specifically, the frequency conversion unit applying frequency conversion to an H polarized wave signal includes an LNA 204A amplifying an H polarized wave signal received by feed horn 203, and a distributor 207A dividing the output from LNA 204A into two.

The frequency conversion unit applying frequency conversion to an H polarized wave signal further includes band pass filters 206A and 206B removing image signals from the two outputs of distributor 207A, local oscillators 218A and 218B, mixers 208A and 208B mixing a local oscillation signal output from local oscillators 218A and 218B (signal of frequency 9.75 GHz and signal of frequency 10.6 GHz) with the outputs of band pass filters 206A and 206B, respectively, and intermediate frequency amplifiers 209A and 209B amplifying IF signals of an intermediate frequency band from mixers 208A and 208B, respectively.

The frequency conversion unit applying frequency conversion to a V polarized wave signal includes an LNA 204B amplifying a V polarized wave signal received at feed horn 203, and a distributor 207B dividing the output of LNA 204B into two.

The frequency conversion unit applying frequency conversion to a V polarized wave signal further includes band pass filters 206C and 206D removing image signals from the two outputs of distributor 207B, mixers 208C and 208D mixing a local oscillation signals output from both of local oscillators 218A and 218B with the outputs of band pass filters 206C and 206D, and intermediate frequency amplifiers 209C and 209D amplifying IF signals of intermediate frequency band output from mixers 208C and 208D, respectively.

The universal twin low noise converter is also provided with a radio frequency selection circuit 225 selecting two from the four IF signals that are frequency-converted versions of the H polarized wave signal and V polarized wave signal output from the frequency conversion unit for output.

The universal twin low noise converter further includes intermediate frequency amplifiers 210A and 210B amplifying an IF signal of intermediate frequency band output from radio frequency selection circuit 225, capacitors 212A and 212B transmitting the outputs of intermediate frequency amplifiers 210A and 210B to terminals P1 and P2, respectively, inductors 214A and 214B for transmitting DC voltage, and capacitors 216A and 216B.

The universal twin low noise converter further includes a power supply circuit & switch control unit 221. Power supply circuit & switch control unit 221 receives voltage from terminals P1 and P2 to deliver power supply voltage to each circuit in the low noise converter and carries out a command to switch the output with respect to radio frequency selection circuit 225.

Specifically, voltage is supplied to an LNA group 205 formed of LNAs 204A and 204B, a first intermediate frequency amplification unit 209 formed of local oscillators 218A and 218B and intermediate frequency amplifiers 209A-209D, and a second intermediate frequency amplification unit 211 formed of intermediate frequency amplifiers 210A and 210B.

The signal to be output to each terminal is selected by radio frequency selection circuit 225 and power supply circuit & switch control unit 221. Specifically selection between a high band (frequency band of 1100-2150 MHz) and a low band (frequency band of 950-1950 MHz) and selection between an H polarized wave signal and a V polarized wave signal are carried out by radio frequency selection circuit 225 and power supply circuit & switch control unit 221.

In this universal twin low noise converter, the switching scheme of incoming signals from a satellite was realized using generally a 4-input 2-output switch IC (for example, the aforementioned radio frequency selection circuit 225).

However, the recent years have seen the presence of an IC that implements the functions of a mixer, a local oscillator, and an intermediate frequency amplifier on one chip. Therefore, the possibility of mounting a switching circuit on a microwave signal circuit of 12 GHz is now enhanced to be adapted to practical use.

As technical documents of the switching circuit art, Japanese Patent Laying-Open No. 2001-168751 (PTL 1) and Japanese Patent Laying-Open No. 8-293812 (PTL 2) can be cited.

PTL 1 discloses a satellite broadcasting reception system, a low noise block down converter and a satellite broadcasting receiver employed in the satellite broadcasting reception system, as set forth below. Specifically, the low noise block down converter includes a conversion unit receiving a plurality of types of polarized wave signals transmitted from each of a plurality of satellites to convert the plurality of polarized wave signals into a plurality of intermediate frequency signals, an amplification switch connected to the conversion unit, having a plurality of outputs connected to a plurality of output ports, respectively, receiving a plurality of intermediate frequency signals, and determining the status according to a selection signal for providing amplified intermediate frequency signals, and a first control unit receiving externally applied digital serial data for selecting a satellite via an output port, and providing a selection signal based on the digital serial data.

PTL 2 discloses a switch circuit of a converter for satellite broadcasting (wireless reception device). The switch circuit of a satellite broadcasting converter switches a plurality of local oscillators incorporated in the satellite broadcasting converter and having a plurality of oscillation frequencies according to a pulse signal overlapped with a band switching pulse signal sent out from a satellite broadcasting tuner. The switch circuit includes a filter circuit receiving a pulse signal from the satellite broadcasting tuner for extracting only the frequency component of the band switching pulse signal, an amplification circuit amplifying the pulse signal from the filter circuit, a rectifying circuit rectifying the pulse signal amplified by the amplification circuit, a comparison circuit comparing the DC voltage from the rectifying circuit with a reference voltage to output a signal indicating whether the pulse signal is overlapped with a band switching pulse signal, and a drive circuit receiving a signal from the comparison circuit to drive a local oscillator of an oscillation frequency corresponding to the compared result.

To realize a switching circuit at a microwave signal circuit corresponding to the frequency band of 12 GHz, conventionally a plurality of amplification circuits employing high electron mobility transistors (HEMT) are connected in parallel, which are respectively turned ON/OFF to switch (select) a signal (universal single LNB, or the like).

In the case where the above-described switching method is to be applied to a universal twin low noise converter, signal switching is conducted by turning ON/OFF the succeeding-stage amplification circuits of the microwave signal amplification circuit. Particularly in the case where an HEMT is employed as the amplification element in the succeeding-stage amplification circuit, the signal could not be completely cut even if the HEMT is OFF. Due to signal leakage, the desired isolation property could not be achieved.

The usage of a PIN (P-Intrinsic-n) diode is known to realize signal selection. A PIN diode corresponding to a microwave signal related to the frequency band of 12 GHz is so expensive that it cannot be readily employed for general consumer products.

In view of the foregoing, an object of the present invention is to provide a low noise converter that can be readily realized at low cost without degrading the desired isolation property when signal switching of a universal twin low noise converter is implemented by switching the ON/OFF state of a microwave amplification circuit of 12 GHz.

SUMMARY OF THE INVENTION

A low noise converter according to the present invention includes a plurality of amplification circuits receiving a plurality of polarized wave signals transmitted from a satellite for amplifying the plurality of polarized wave signals, respectively, a plurality of switch circuits, each selecting one of the outputs from the plurality of amplification circuits, a plurality of filter circuits provided corresponding to the plurality of switch circuits, respectively, for removing an image signal, a plurality of signal mixer-amplifiers provided corresponding to the plurality of filter circuits, respectively, to frequency-convert each output from the plurality of filter circuits by mixing with a local oscillation signal and to amplify the frequency-converted signal, and a plurality of output ports provided corresponding to the plurality of signal mixer-amplifiers, respectively, receiving the outputs from the plurality of signal mixer-amplifiers, respectively.

Preferably, the low noise converter of the present invention further includes a control unit controlling the switch circuits. Each of the switch circuits includes a first bipolar transistor receiving a first of a plurality of polarized wave signals at a base and ground potential at an emitter, and a second bipolar transmitter receiving a second of the plurality of polarized wave signals at a base and ground potential at an emitter. Each of the switch circuits amplifies the first and second polarized wave signals. The control unit toggles the first and second bipolar transistors.

Preferably, the control unit supplies applied voltage to the base and collector of the first and second bipolar transistors such that each of the switch circuits selects the first or second polarized wave signal.

Further preferably, the control unit fixes the voltage of the collector of the first and second bipolar transistors at a constant voltage, and supplies applied voltage to the base such that each of the switch circuits selects the first or second polarized wave signal.

A main advantage of the present invention is that a low noise converter that can be readily realized at low cost without degrading the desired isolation property can be provided, based on switching the ON/OFF state of a microwave amplification circuit of 12 GHz for the signal switching of a universal twin low noise converter.

The aforementioned and other objects, features, aspects and advantages of the present invention will become apparent from the detailed description of the present invention set forth below in conjunction with the accompanying drawings.

DESCRIPTION OF THE PREFERRED EMBODIMENTS

Figure 1:
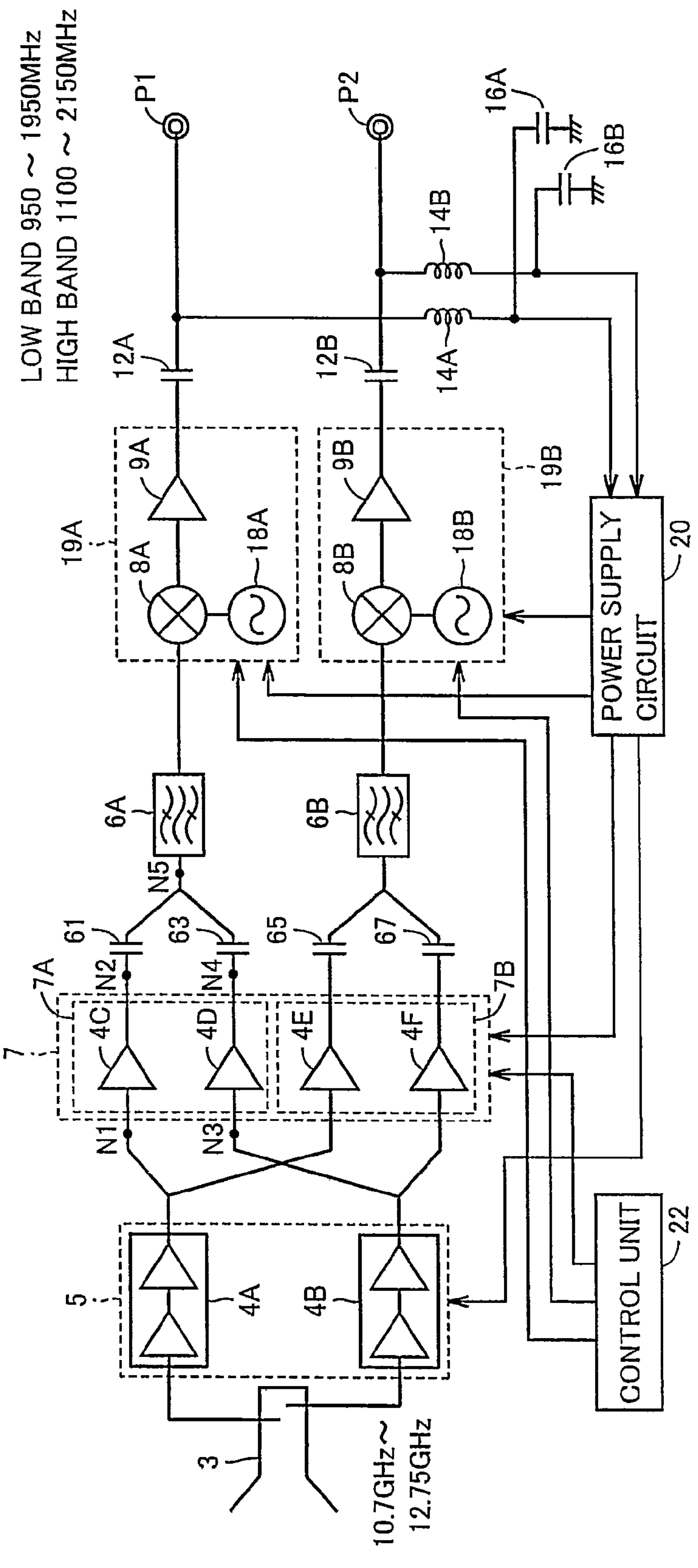
FIG. 1 is a block diagram representing a configuration of the main parts of the circuit of a universal twin low noise converter according to an embodiment of the present invention.

The present invention will be described in detail with reference to the drawings. In the drawings, the same or corresponding elements have the same reference characters allotted, and description thereof will not be repeated.

Embodiments

Referring to the block diagram of FIG. 1, a universal twin low noise converter (hereinafter, also referred to as low noise converter) according to an embodiment of the present invention includes a feed horn 3, a low noise amplification unit applying low-noise amplification to an H polarized wave signal received at feed horn 3, and a low noise amplification unit applying low-noise amplification to a V polarized wave signal received at feed horn 3.

Specifically, the low noise amplification unit applying low-noise amplification to an H polarized wave signal includes an LNA 4A amplifying an H polarized wave signal received at feed horn 3. The output of LNA 4A is divided into two to be supplied to switch circuits 7A and 7B (hereinafter, also generically referred to as switch circuit 7).

The low noise amplification unit applying low-noise amplification to a V polarized wave signal includes an LNA 4B amplifying a V polarized wave signal received at feed horn 3. The output from LNA 4B is divided into two to be supplied to switch circuits 7A and 7B.

The low noise converter further includes a band pass filter 6A removing an image signal from the output of switch circuit 7A, and a signal mixer-amplifier 19A frequency-converting the output from band pass filter 6A by mixing with a local oscillation signal and amplifying the frequency-converted signal.

Signal mixer-amplifier 19A includes a local oscillator 18A, a mixer 8A mixing a local oscillation signal output from local oscillator 18A (a signal of 9.75 GHz in frequency and a signal of 10.6 GHz in frequency) with the output from band pass filter 6A, and an intermediate frequency amplifier 9A amplifying the IF signals of an intermediate frequency band output from mixer 8A.

The low noise converter further includes a band pass filter 6B removing an image signal from the output of switch circuit 7B, and a signal mixer-amplifier 19B frequency-converting the output from band pass filter 6B by mixing with a local oscillation signal and amplifying the frequency-converted signal.

Signal mixer-amplifier 19B includes a local oscillator 18B, a mixer 8B mixing respective local oscillation signals output from local oscillator 18B (a signal of frequency 9.75 GHz and a signal of frequency 10.6 GHz) with the output from band pass filter 6B, and an intermediate frequency amplifier 9B amplifying each IF signal of an intermediate frequency band output from mixer 8B.

The low noise converter further includes capacitors 12A and 12B transmitting the outputs of signal mixer-amplifiers 19A and 19B to terminals P1 and P2, respectively, inductors 14A and 14B for transmitting DC voltage, and capacitors 16A and 16B.

The low noise converter further includes a power supply circuit 20. Power supply circuit 20 receives voltage from terminals P1 and P2 to supply power supply voltage to each circuit in the low noise converter.

Specifically, voltage is applied to an LNA group 5 formed of LNAs 4A and 4B, and to signal mixer-amplifiers 19A and 19B formed of switch circuits 7A and 7B, local oscillators 18A and 18B, mixers 8A and 8B, and intermediate frequency amplifier 9A, respectively.

The low noise converter further includes a control unit 22. Control unit 22 carries out signal selection and control of a local oscillation signal with respect to switch circuits 7A and 7B and signal mixer-amplifiers 19A and 19B.

By power supply circuit 20 and control unit 22, a signal output at each terminal is selected. Specifically, selection between a high band (frequency band of 1100-2150 MHz) and a low band (frequency band of 950-1950 MHz), and selection between an H polarized wave signal and a V polarized wave signal are carried out by power supply circuit 20 and control unit 22.

Figure 2:
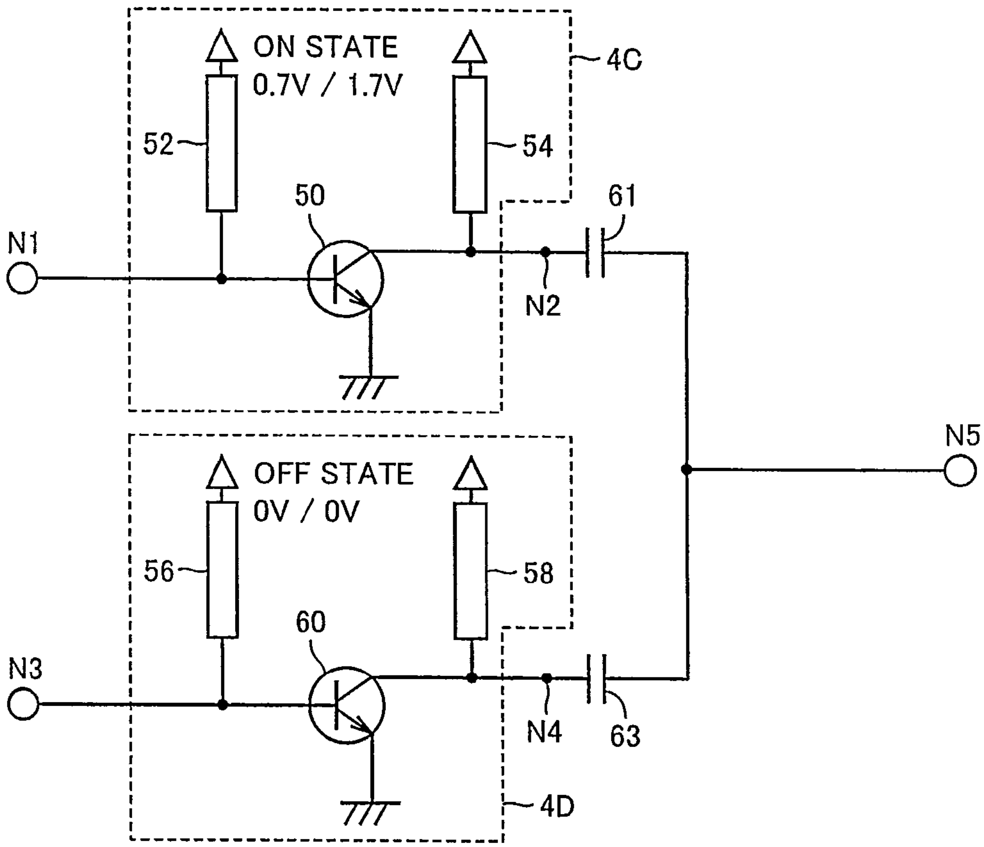
FIG. 2 is an exemplified diagram for describing a switch circuit 7A.

Referring to FIG. 2, switch circuit 7A includes amplification circuits 4C and 4D. Amplification circuit 4C includes RF (radio frequency) cut circuits 52 and 54, and a bipolar transistor 50. Bipolar transistor 50 has its collector terminal connected to a node N2, its emitter terminal receiving ground potential, and its base side connected to a node N1 to receive a signal output from LNA 4A. A capacitor 61 is connected between node N2 and a node N5.

Amplification circuit 4D includes RF cut circuits 56 and 58, and a bipolar transistor 60. Bipolar transistor 60 has its collector terminal connected to a node N4, its emitter terminal receiving ground potential, and its base side connected to a node N3 to receive a signal output from LNA 4B. A capacitor 63 is connected between nodes N4 and N5.

RF cut circuits 52, 54, 56 and 58 are provided such that the signal component is not conveyed elsewhere. Further, capacitors 61, 63, 65 and 57 are provided to cut off bias voltage.

By control unit 22 setting the base voltage and collector voltage of bipolar transistor 50 in amplification circuit 4C at 0.7V and 1.7V, respectively, to turn ON bipolar transistor 50, whereby BPF 6A receives an H polarized wave signal.

By control unit 22 setting the base voltage and collector voltage of bipolar transistor 60 in amplification circuit 4D both at 0V, bipolar transistor 60 is turned OFF, preventing the leakage of a V polarized wave signal. Therefore, BPF 6A will not receive a V polarized wave signal.

Therefore, control unit 22 toggles bipolar transistors 50 and 60 in switch circuit 7A to alternately switch between ON/OFF states, causing the switched polarized wave signal to be amplified for output to BPF 6A.

Switch circuit 7B takes a configuration similar to that of switch circuit 7A. Therefore, description thereof will not be repeated.

Figure 3:
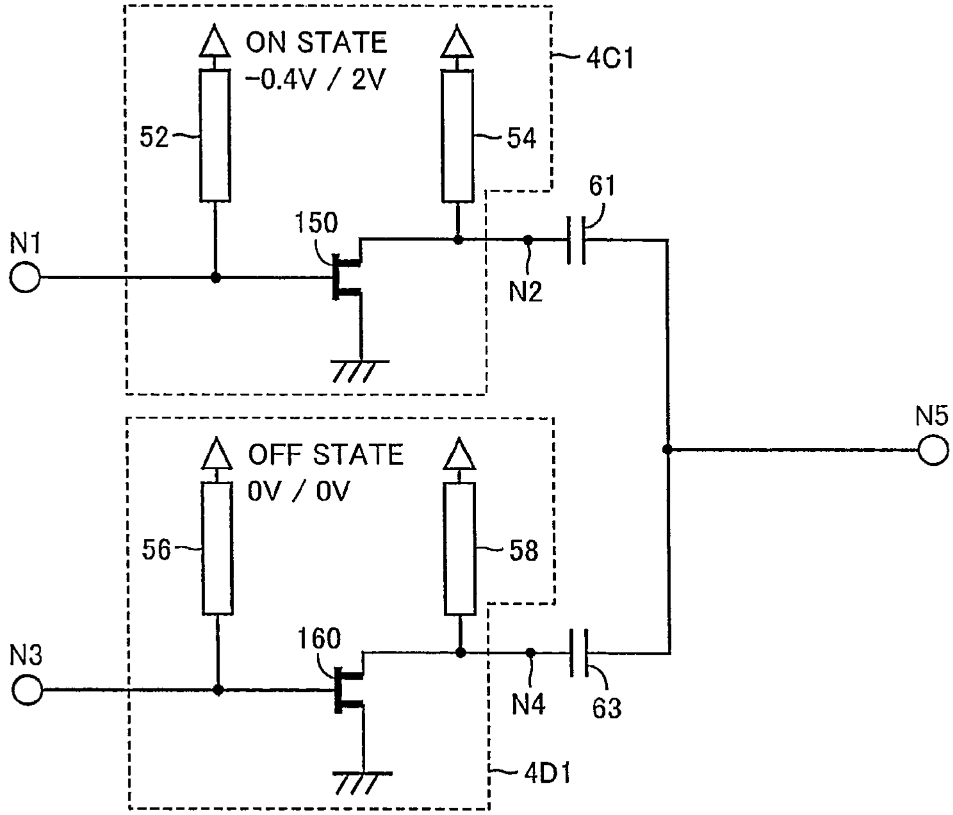
FIG. 3 is a diagram to describe a switch circuit 7A1 for comparison.

FIG. 3 is a diagram to describe a switch circuit 7A1 for comparison. Switch circuit 7A1 will be described based on a comparison with switch circuit 7A of FIG. 2.

Referring to FIG. 3, switch circuit 7A1 includes amplification circuits 4C1 and 4D1, instead of amplification circuits 4C and 4D of switch circuit 7A.

Amplification circuit 4C1 includes an HEMT 150, instead of bipolar transistor 50 in amplification circuit 4D. Amplification circuit 4D1 includes an HEMT 160, instead of bipolar transistor 60 in amplification circuit 4D.

By control unit 22 setting the voltage of the drain and gate of HEMT 150 at −0.4V and 2V, respectively, HEMT 150 is turned ON.

By control unit 22 setting the voltage of the drain and gate of HEMT 160 both at 0V, HEMT 160 is turned OFF.

Even if an H polarized wave signal is selected at switch circuit 7A1, HEMT 160 at the OFF state (non-selected) cannot achieve the desired isolation, leading to leakage of a V polarized wave signal. This will adversely affect the reception system, leading to the possibility of the reception being disabled in the worst case.

This is due to a constant signal, although not amplified, being passed through even when HEMT 160 is OFF. The isolation property at an OFF state of switch circuit 7A1 is poor.

In contrast, bipolar transistor 60 attains a favorable isolation property than HEMT 160 in a non-selected state. Leakage of a V polarized wave signal under an OFF state will not occur. Thus, the desired isolation property can be achieved.

Figure 4:
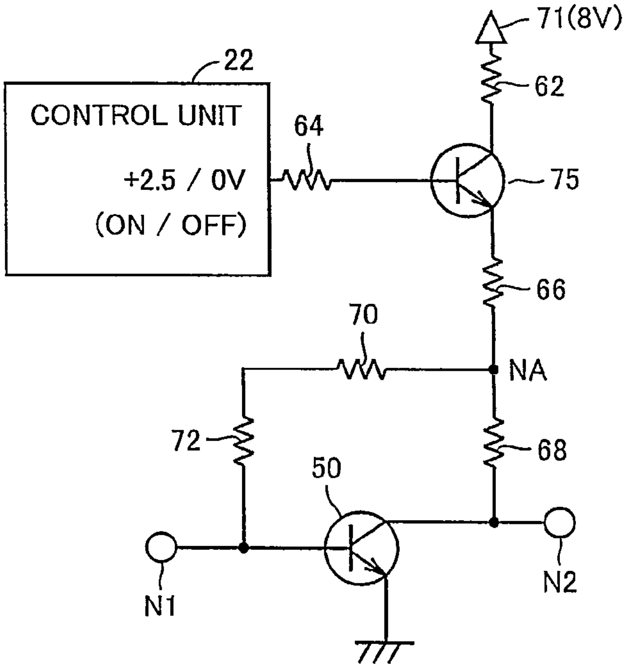
FIG. 4 is a circuit diagram representing a specific configuration of an amplification circuit 4C in FIG. 2.

FIG. 4 is a circuit diagram representing a specific configuration of amplification circuit 4C in FIG. 2. Referring to FIG. 4, amplification circuit 4C includes resistor elements 62, 64, 66, 68, 70 and 72, bipolar transistors 50 and 75, and a constant voltage source 71.

The voltage supplied to node N1 is applied to the base terminal of bipolar transistor 50. The voltage supplied to node N2 is applied to the collector terminal of bipolar transistor 50. Ground potential is applied to the emitter terminal of bipolar transistor 50.

Resistor elements 70 and 72 are connected in series between nodes N1 and NA. Resistor element 68 is connected between nodes NA and N2. The voltage supplied to node NA is supplied from constant voltage source 71 through the switching of the ON/OFF state of bipolar transistor 75 by control unit 22.

Resistor element 62 is connected between constant voltage source 71 and the collector terminal of bipolar transistor 75. Resistor element 64 is connected between control unit 22 and the base terminal of bipolar transistor 75. Resistor element 66 is connected between the emitter terminal of bipolar transistor 75 and node NA. Accordingly, control unit 22 can switch the ON/OFF state of bipolar transistor 75.

Specifically, voltage 2.5V is output for control unit 22 to turn ON bipolar transistor 50. In contrast, constant voltage (for example, 8V) is applied from constant voltage source 71. Accordingly, the voltage applied to the base terminal and collector terminal is controlled.

To set bipolar transistor 50 at an OFF state, control unit 22 lowers the output potential from control unit 22 down to ground potential. In contrast, constant voltage (for example, 8V) is applied from constant voltage source 71. Accordingly, the voltage applied to the base terminal and collector terminal is controlled.

To supply the aforementioned voltage of each terminal of the bipolar transistor, the voltage of 0.7V and 1.7V will be supplied to the base terminal and collector terminal, respectively, of bipolar transistor 50, as shown in FIG. 2, by setting the resistance of resistor elements 62, 64, 66, 68, 70 and 72 at 0 (Ω), 10 (kΩ), 0 (Ω), 0 (Ω), 120 (kΩ), and 51 (Ω), respectively.

Amplification circuit 4D takes a similar configuration. Therefore, description thereof will not be repeated.

Figure 5:
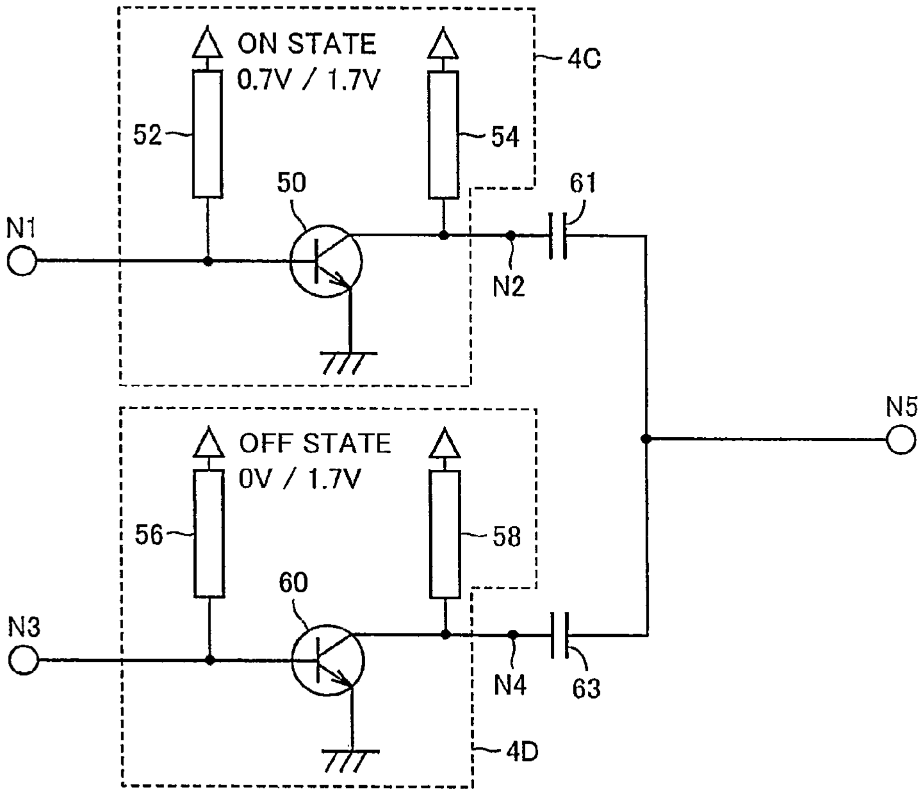
FIG. 5 is a diagram to describe another example of the relationship of voltage applied to each terminal of bipolar transistors in switch circuit 7A.

FIG. 5 is a diagram to describe another example of the relationship of voltage applied to each terminal of the bipolar transistor in switch circuit 7A. The voltage applied to each of the terminals of bipolar transistors 50 and 60 will be described with reference to FIG. 5.

By applying the same voltage (for example, 1.7V) to the collector terminals while altering the voltage applied to the base terminals in bipolar transistors 50 and 60 of amplification circuits 4C and 4D, respectively, the ON/OFF state of bipolar transistors 50 and 60 can be switched to conduct signal switching.

Signal switching can be carried out readily by a similar voltage control for switch circuit 7B. Therefore, description thereof will not be repeated. By regulating only the voltage applied to the base terminal, signal switching (selection) can be facilitated.

Figure 6:
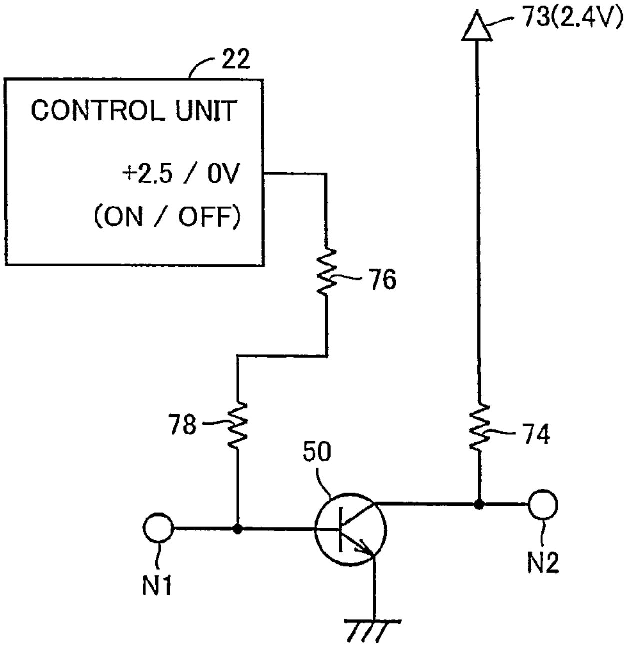
FIG. 6 is a circuit diagram representing a specific configuration of an amplification circuit 4C in FIG. 5.

FIG. 6 is a circuit diagram representing a specific configuration of amplification circuit 4C in FIG. 5. Referring to FIG. 6, amplification circuit 4C includes resistor elements 74, 76 and 78, bipolar transistor 50, and a constant voltage source 73.

The voltage supplied at node N1 is applied to the base terminal of bipolar transistor 50. The voltage supplied at node N2 is applied to the collector terminal of bipolar transistor 50. The emitter terminal of bipolar transistor 50 is connected to ground potential.

Resistor elements 76 and 78 are connected in series between control unit 22 and node N1 (base terminal). Resistor element 74 is connected between constant voltage source 73 and node N2 (collector terminal).

By such a configuration, the applied voltage is controlled by control unit 22, allowing the ON/OFF state of bipolar transistor 50 to be determined based on the applied voltage. The voltage applied to the collector terminal is always constant. In contrast, the voltage applied to the base terminal is regulated by control unit 22.

Specifically, control unit 22 outputs the voltage of 2.5V to turn ON bipolar transistor 50. In contrast, constant voltage (for example, 2.4V) is applied from constant voltage source 73. Accordingly, the potential supplied to the base terminal is adjusted by control unit 22, whereas a constant voltage is supplied to the collector terminal from constant voltage source 73.

In order to turn OFF bipolar transistor 50, control unit 22 lowers the output potential from control unit 22 down to ground potential. In contrast, constant voltage (for example, 2.4V) is applied from constant voltage source 73. Accordingly, ground potential is applied to the base terminal whereas constant voltage is supplied to the collector terminal by constant voltage source 73.

For example, when the resistance value of resistor elements 74, 76 and 78 are set at 10 (Ω), 150 (kΩ) and 47 (Ω), respectively, to supply the aforementioned voltage to each terminal of the bipolar transistors, a voltage of 0.7V can be applied to the base terminal of bipolar transistor 50, as shown in FIG. 2, when control unit 22 provides the applied voltage of 2.5V.

Figure 7:
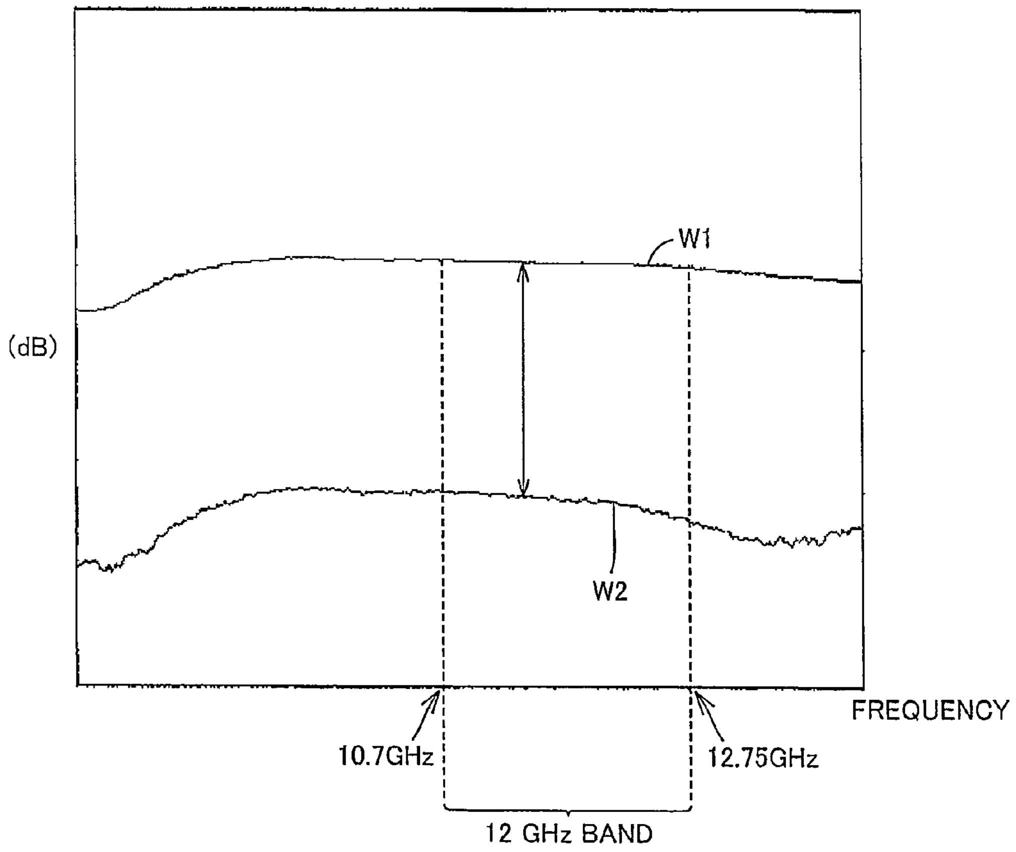
FIG. 7 is a diagram to describe the isolation property of switch circuit 7A shown in FIGS. 5 and 6.
Figure 8:
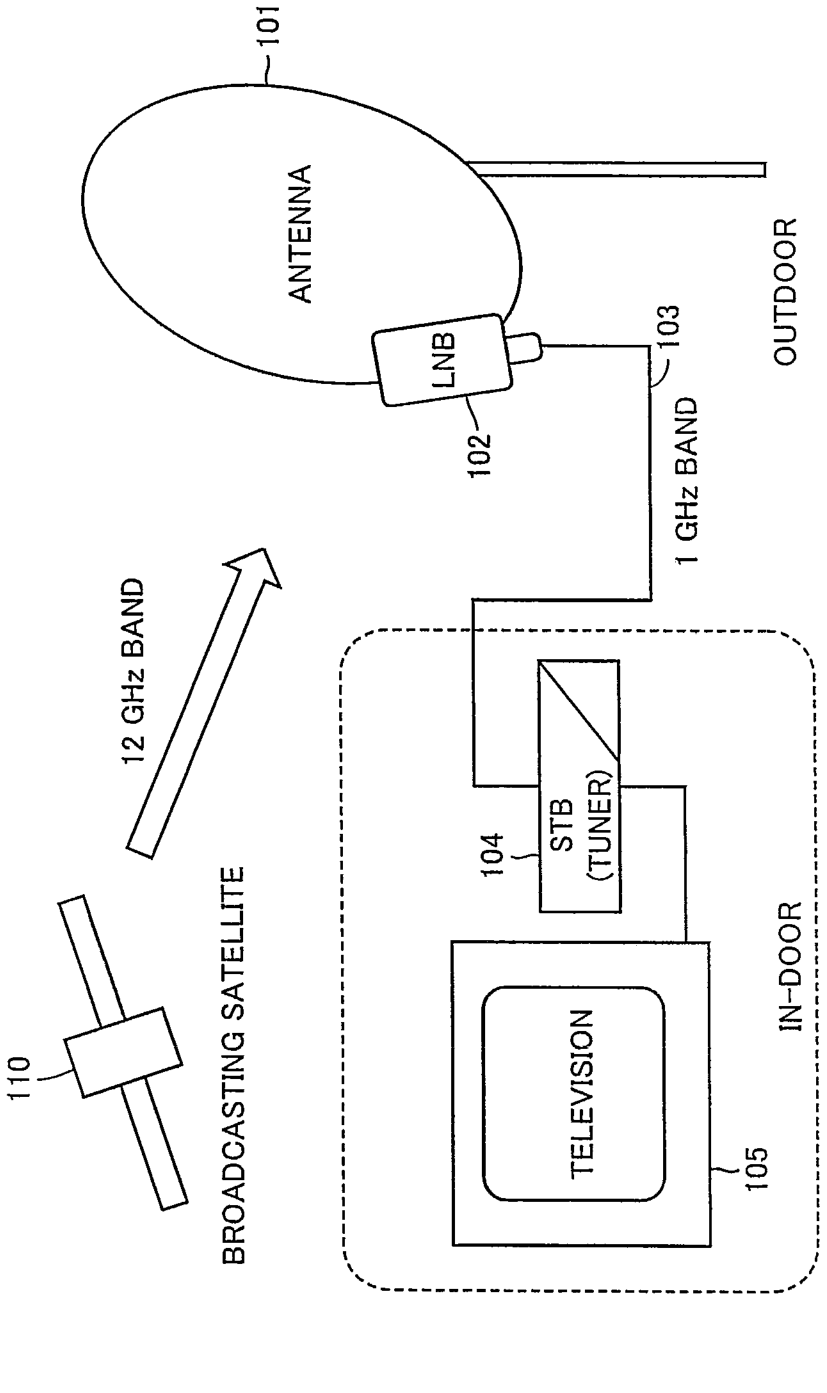
FIG.8 PRIOR ART
FIG. 8 represents a typical satellite broadcasting reception system.
Figure 9:
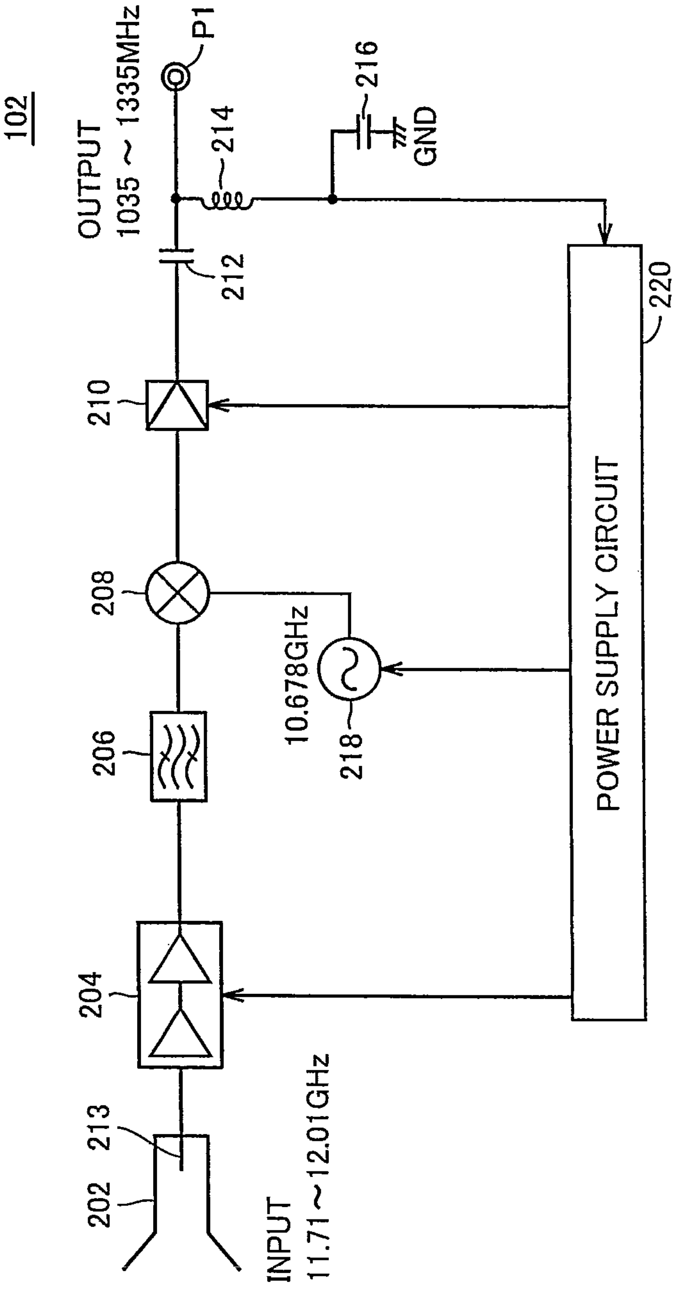
FIG.9 PRIOR ART
FIG. 9 is a block diagram representing an example of a circuit of a general low noise converter.
Figure 10:
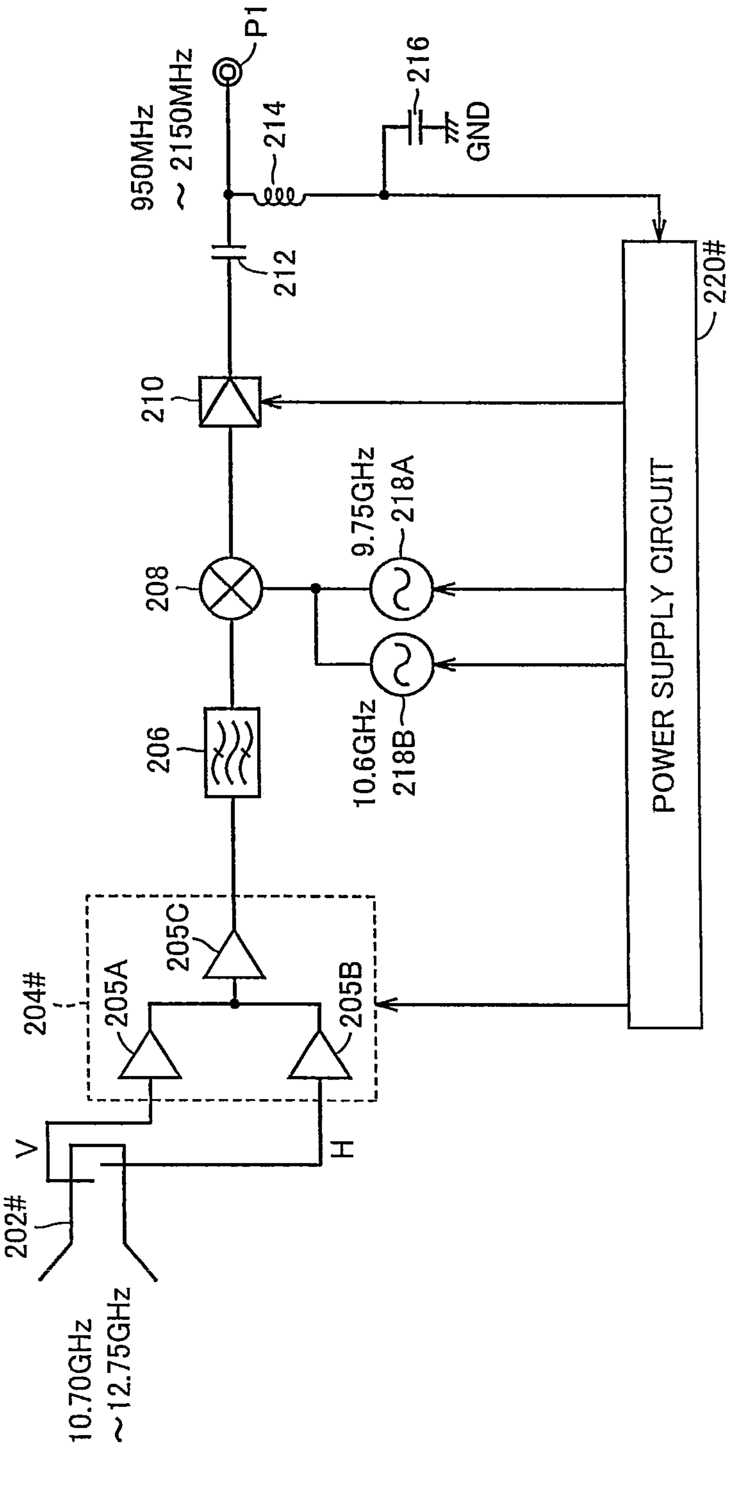
FIG.10 PRIOR ART
FIG. 10 is a block diagram representing an example of a circuit of a universal low noise converter.
Figure 11:
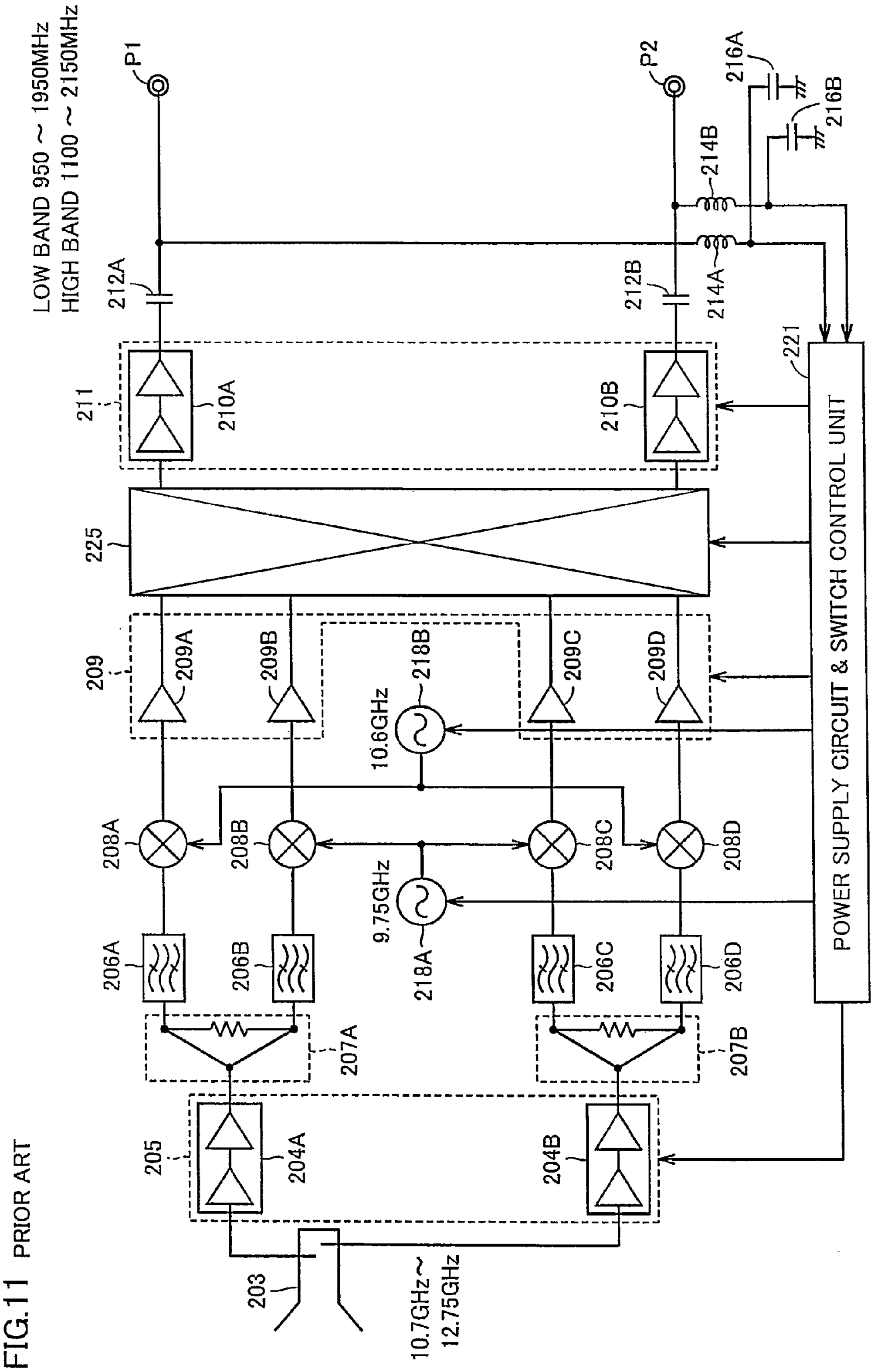
FIG.11 PRIOR ART
FIG. 11 is a block diagram representing an example of a circuit of a universal twin low noise converter.

FIG. 7 is a diagram to describe the isolation property of switch circuit 7A shown in FIGS. 5 and 6.

In FIG. 7, the frequency band is plotted along the horizontal axis whereas the signal intensity is plotted along the vertical axis. Waveform W1 indicates the output signal when bipolar transistor 50 attains an ON state. Waveform W2 represents an output signal when bipolar transistor 50 attains an OFF state.

It is appreciated from FIG. 7 that sufficient isolation can be established by the switching of the ON/OFF state of bipolar transistor 50 in the frequency band of 12 GHz.

Likewise with the isolation property shown in FIG. 7, sufficient isolation property can be established for switch circuit 7A shown in FIGS. 2 and 4.

By virtue of the configuration of the present embodiment, an isolation property within the tolerable range of the 12 GHz band (10.7 GHz-12.75 GHz) can be achieved.

An embodiment of the present embodiment will be summarized hereinafter with reference to FIG. 1 and the like.

As shown in FIG. 1, a low noise converter includes a plurality of amplification circuits 4A and 4B receiving and amplifying a plurality of polarized wave signals transmitted from a satellite, a plurality of switch circuits 7A and 7B, each selecting one of the outputs from the plurality of amplification circuits, a plurality of filter circuits 6A and 6B provided corresponding to the plurality of switch circuits, respectively, for removing an image signal, a plurality of signal mixer-amplifiers 19A and 19B provided corresponding to the plurality of filter circuits 6A and 6B, respectively, to frequency-convert each output from the plurality of filter circuits 6A and 6B by mixing with a local oscillation signal and to amplify the frequency-converted signal, and a plurality of output terminals P1 and P2 provided corresponding to the plurality of signal mixer-amplifiers 19A and 19B, respectively, receiving the outputs of signal mixer-amplifiers 19A and 19B, respectively.

The low noise converter according to an embodiment further includes, as shown in FIGS. 2 and 5, a control unit 22 controlling switch circuits 7A and 7B. Each of the switch circuits 7A and 7B includes a bipolar transistor 50 receiving a first of a plurality of polarized wave signals at a base and ground potential at an emitter, and a bipolar transistor 60 receiving a second of the plurality of polarized wave signals at a base and ground potential at an emitter. Each of the switch circuits 7A and 7B amplifies the first and second polarized wave signals. Control unit 22 toggles bipolar transistors 50 and 60.

Further, as shown in FIGS. 2 and 4, control unit 22 supplies applied voltage to the base and collector of bipolar transistors 50 and 60 such that each of the switch circuits 7A and 7B selects the first or second polarized wave signal.

Furthermore, as shown in FIGS. 5 and 6, control unit 22 fixes the voltage of the collector of bipolar transistors 50 and 60 at a constant voltage, and supplies applied voltage to the base such that each of the switch circuits 7A and 7B selects the first or second polarized wave signal.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A low noise converter comprising:

first and second amplification circuits receiving first and second polarized wave signals transmitted from a satellite and amplifying said first and second polarized wave signals, respectively;

a plurality of switch circuits, each selecting one of the outputs from said first and second amplification circuits;

a plurality of filter circuits provided corresponding to said plurality of switch circuits, respectively, for removing an image signal;

a plurality of signal mixer-amplifiers provided corresponding to said plurality of filter circuits, respectively, and each configured to frequency-convert an output from a corresponding filter circuit by mixing with a local oscillation signal and to amplify the frequency-converted signal; and a plurality of output ports provided corresponding to said plurality of signal mixer-amplifiers, respectively, for receiving an output from said plurality of signal mixer-amplifiers, wherein each of said plurality of switch circuits includes:

a first bipolar transistor receiving said first polarized wave signal at a base, and ground potential at an emitter; and a second bipolar transistor receiving said second polarized wave signal at a base, and ground potential at an emitter.

2. The low noise converter according to claim 1, further comprising a control unit controlling each of said plurality of switch circuits, wherein said control unit toggles said first and second bipolar transistors.

3. The low noise converter according to claim 2, wherein said control unit supplies applied voltage to the base and collector of said first and second bipolar transistors such that each of said plurality of switch circuits selects said first or second polarized wave signal.

4. The low noise converter according to claim 2, wherein said control unit fixes voltage of the collector of said first and second bipolar transistors at a constant voltage, and supplies applied voltage to the base such that each of said plurality of switch circuits selects said first or second polarized wave signal.

* * * * *